(12) United States Patent
Arosio

(10) Patent No.: US 6,659,130 B2
(45) Date of Patent: Dec. 9, 2003

(54) QUICK-CONNECTION COUPLING WITH FLAT CONNECTION AND ARRANGEMENTS FOR AVOIDING THE HYDRAULIC FLUID ESCAPING DURING A JOINING OR SEPARATING OPERATION

(75) Inventor: Massimo Arosio, Rivolta d'Adda (IT)

(73) Assignee: Faster S.r.L., Rivolta d'Adda (IT)

( * ) Notice: Subject to any disclaimer, the term of this patent is extended or adjusted under 35 U.S.C. 154(b) by 0 days.

(21) Appl. No.: 10/146,427

(22) Filed: May 14, 2002

(65) Prior Publication Data

US 2002/0174904 A1 Nov. 28, 2002

(30) Foreign Application Priority Data

May 25, 2001 (IT) ..................... MI2001A1105

(51) Int. Cl.[7] ............................................. F16L 37/28
(52) U.S. Cl. ................................................. 137/614.03
(58) Field of Search .................... 137/614.03, 614.04, 137/614.05

(56) References Cited

U.S. PATENT DOCUMENTS 4,982,761 A * 1/1991 Kreczko et al. ....... 137/614.03
5,996,624 A * 12/1999 Ekman ................... 137/614.03
6,179,001 B1 * 1/2001 Schutz ................... 137/614.03

* cited by examiner

Primary Examiner—Kevin Lee
(74) Attorney, Agent, or Firm—Kirschstein et al.

(57) ABSTRACT

Quick-connection coupling with flat connection and arrangements for avoiding the hydraulic fluid escaping during a joining or separating operation Quick-connection coupling with a flat connection and arrangements for avoiding the hydraulic fluid escaping during a joining or separating operation, it being provided that the receiving component has an inner, displaceable sleeve which comprises two components which are arranged concentrically with one another and can be displaced in relation to one another, it being the case that the displaceable component, designed in two parts, comprises a first tubular component, of which the front part has a guide and sliding surface for a sealing ring which is arranged in the interior of the projecting component which is to be connected, and the guide and sliding surface terminates at a stop step on which a spring means acts, it being the case that the first tubular component is accommodated in a displaceable manner by the front part of a second tubular component, which has a step which can be influenced by the end piece of the first tubular component, and the free end of the second tubular component has a collar which interacts with an annular thickened portion of a union nut, which is arranged in a stationary manner.

8 Claims, 4 Drawing Sheets

QUICK-CONNECTION COUPLING WITH FLAT CONNECTION AND ARRANGEMENTS FOR AVOIDING THE HYDRAULIC FLUID ESCAPING DURING A JOINING OR SEPARATING OPERATION

BACKGROUND OF THE INVENTION

The above invention relates to a quick-connection coupling of flat configuration with arrangements for avoiding hydraulic fluid escaping during a joining or separating operation.

The prior art has disclosed the use of quick-connection couplings of so-called flat configuration. These couplings comprise a tubular component, also referred to as receiving component, which is connected to flexible conduits for channeling a pressurized hydraulic fluid.

It is possible to connect to the tubular component, which is a constituent part of the quick-connection coupling, a second component, which is essentially cylindrical.

The cylindrical component can be connected, via flexible conduits, to a piece of equipment, e.g. a tractor, some other agricultural machine or a construction machine, e.g. an excavator.

The abovementioned machines are usually equipped with different auxiliary arrangements. These auxiliary arrangements are fitted on the machine or removed therefrom, depending on the requirements at any one time.

Quick-connection couplings of flat configuration are used for these operations. These couplings are connected to conduits which accommodate highly pressurized hydraulic fluid. The couplings used allow rapid connection or release, the hydraulic fluid in the conduits being pressurized.

By virtue of the known quick-connection coupling of flat configuration, it is possible for the components of the coupling to be joined without any mechanical difficulties, and this connecting operation can also be carried out when the hydraulic fluid in the flexible conduits is pressurized.

For this purpose, in the known quick-connection couplings, there is provided, in the tubular or in the projecting component of the coupling, a single-piece inner, tubular sliding part which, according to the prior art, is designed as a single-piece component.

In the case of a quick-connection coupling which is of such a construction, hydrostatic shearing forces which are of the same magnitude as one another but act in opposite directions, and occur both in the interior of the tubular component and in the interior of the projecting components, make it possible for the single-piece sliding part, which is arranged in the interior of the tubular coupling part, to be easily displaced.

This displacement operation is carried out during a coupling movement, even if there are considerable pressures prevailing in the conduits.

The quick-connection coupling of this type known from the prior art has the disadvantage that, during the movement of the sliding part, which is provided as a single-piece component in the interior of the tubular coupling element, a critical situation occurs beneath the different components, between the displacement body and the annular seal arranged in the interior of the tubular component, and this results in the elimination of the hydrostatic equilibrium between the different components of the quick-connection coupling and the establishment of a shearing force which extends in the axial direction and leads to an extraordinarily quick displacement movement of the movable component and to the sealing ring arranged in the interior of the tubular component being suddenly released.

In the case of the known quick-connection coupling, this fact results in the undesirable escape of hydraulic fluid during each joining or separating operation.

Furthermore, damage to the sensitive sealing ring, which inevitably results in hydraulic fluid being lost, is unavoidable, particularly if the operation of joining the quick-connection coupling takes place relatively frequently.

BACKGROUND OF THE INVENTION

It is an object of the above invention to avoid the disadvantages of the prior art and to propose a novel quick-connection coupling in the case of which there is no uncontrolled and sudden, premature displacement movement of the inner displacement element, and the situation where the annular seal arranged in the interior of the tubular component is influenced by a pressurized hydraulic fluid and is damaged during repeated joining or separating operations of the components of the quick-connection coupling is thus avoided.

According to the invention, these objects are achieved by means of a quick-connection coupling of flat configuration in that the tubular component has an inner displacement element which is designed in two parts, and these parts are arranged concentrically with one another and can be displaced in relation to one another.

It is particularly advantageous for the displacement element to comprise two parts, i.e. a first tubular component, of which the front part has a guide and displacement surface for a sealing ring which is arranged in the interior of the projecting component which is to be connected, it being the case that the guide and sliding surfaces terminate at a stop step against which a spring means butts, and the first tubular component is accommodated in a displaceable manner by the front element of a second tubular component, and this second tubular component has a step which can be influenced by the end of the first tubular component, the free end of the second tubular component having a collar which interacts with an annular protrusion of a union sleeve, which is arranged in a stationary manner.

A further advantage is that an annular seal is provided between the inner surface of the first tubular component and the outer surface of the second tubular component.

A sealing means is advantageously provided between the front part of an inner receiving shaft and the first tubular component.

Furthermore, it has proven advantageous to provide a centrally arranged receiving shaft, of the tubular component, which is provided, on its front side, with a circumferentially extending step against which the front end of the first tubular component, which is a constituent part of the displaceable, two-part arrangement, butts.

BRIEF DESCRIPTION OF THE DRAWINGS

Further advantages of the invention can be gathered from the following description, the claims and the attached drawings, in which:

DETAILED DESCRIPTION OF THE PREFERRED EMBODIMENTS

Figure 1:
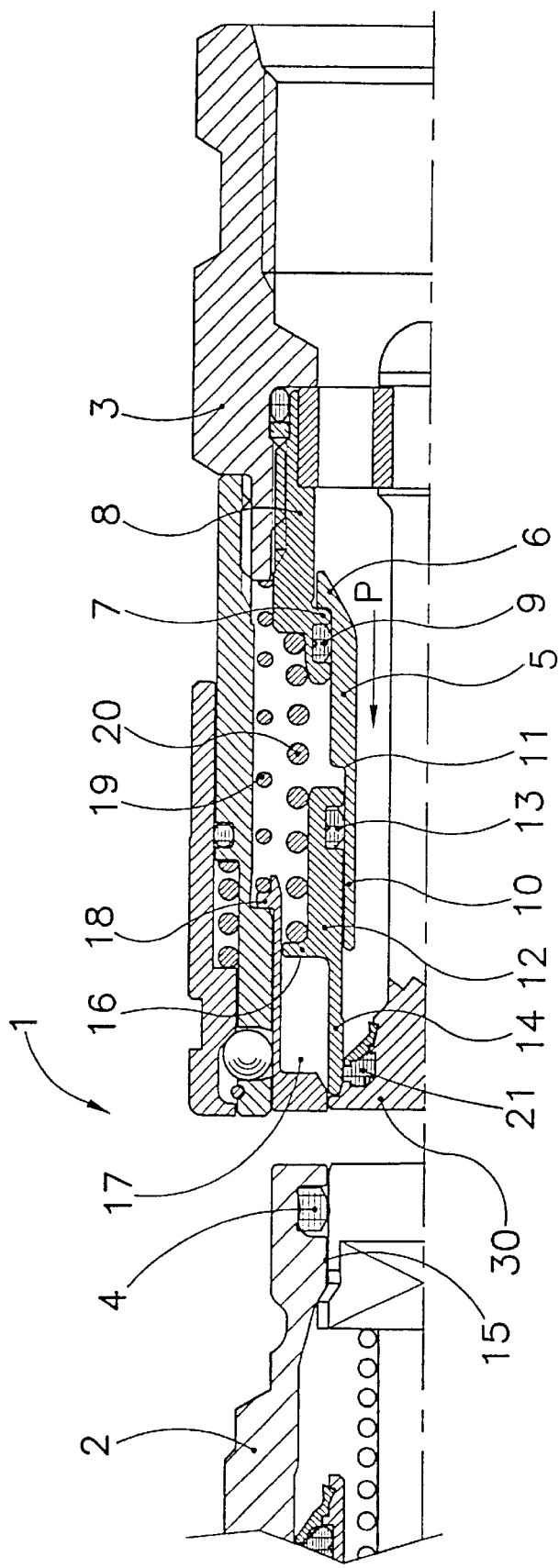
FIG. 1 shows the components of the quick-connection coupling of flat configuration in section prior to the joining operation.

As can be gathered from FIG. 1, the quick-connection coupling, designated 1 overall, comprises a projecting component 2 and a sleeve-like component 3.

The two components 2 and 3 are usually arranged at the free end of flexible conduits in which a pressurized hydraulic fluid is contained.

At the inner, front side, the projecting component 2 has a sealing ring 4 which has the task, during the operation of joining or separating the components, of avoiding the escape of hydraulic fluid subjected to a pressure (P).

The hydraulic fluid is permanently present in the interior of the components 2, 3 of the quick-connection coupling 1.

The sleeve-like component 3 has a displacement element 5 in the interior. At its end which is oriented toward the interior of the component 3, said displacement element 5 has an annular thickened portion 6, which forms a step against which an annular thickened portion 7 butts, the latter being arranged on the inside of a bushing which is provided in a stationary manner.

A filling ring 9 is provided between the displacement element 5 and the bushing 8.

On its front side, the displacement element 5 has a tube element 10 which has a relatively thin wall and a relatively small diameter and projects from a step which forms an annular connection 11. The front part 10 of the displaceable tubular part 5 accommodates a further displacement part 12 in a movable manner.

The displacement part 5 can thus be displaced in relation to the union nut 8 without obstruction and accommodates a further displaceable component 12.

A sealing ring 13 is arranged between the body of the displaceable component 12 and the wall 10 of the displaceable component 5.

The rear end of the displacement part 12 is designed with a relatively large wall thickness, whereas the front segment of the displacement part 12 is designed with a reduced wall thickness.

The diameter of the front part 14 of the displacement element 12 is selected such that it is still possible for the component 14 to penetrate without obstruction into the opening 15, passing through the projecting component 2, and, rather than damaging the seal 4 in the process, to function as a guide part and provide a sealed zone which already takes effect during the movements for joining the projecting component 2 and the tubular component 3.

A step or a stop 16 is formed between the thin-walled end 14 and the thicker-walled end of the displaceable component 12, and pressed against said step or stop is an annular surface 17 which is a constituent part of a further displaceable component 18, which is retained in the rest position by a spring 19. The step or the stop 16, at the same time, forms an abutment surface for the endpiece of a spring means 20.

Arranged at the front end of a fixedly arranged shaft-like component 30, which is conventional for quick-connection couplings of flat configuration and passes through the sleeve-like component 3, is an annular seal 21, which butts against the outer surface of the thinner wall 14 of the displacement element 12.

Figure 2:
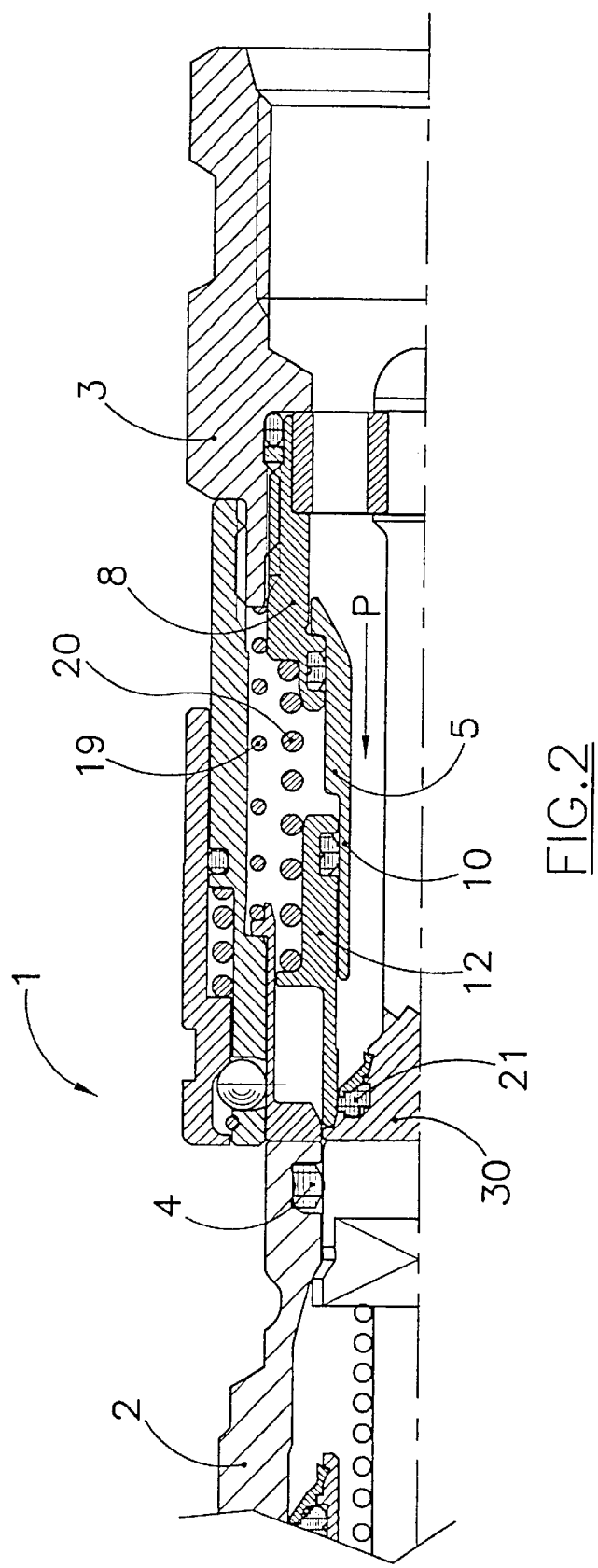
FIG. 2 shows the quick-connection coupling in section at the beginning of the joining operation.

FIG. 2 illustrates the quick-connection coupling 1 just prior to the projecting component 2 and the sleeve-like component 3 being joined.

All the displaceable components and further components are still located in their rest position, as has already been described above and is illustrated in FIG. 1.

The hydraulic fluid (P) is present in the interior of the projecting component 2 and in the interior of the sleeve-like component 3, under high hydrostatic pressure.

Figure 3:
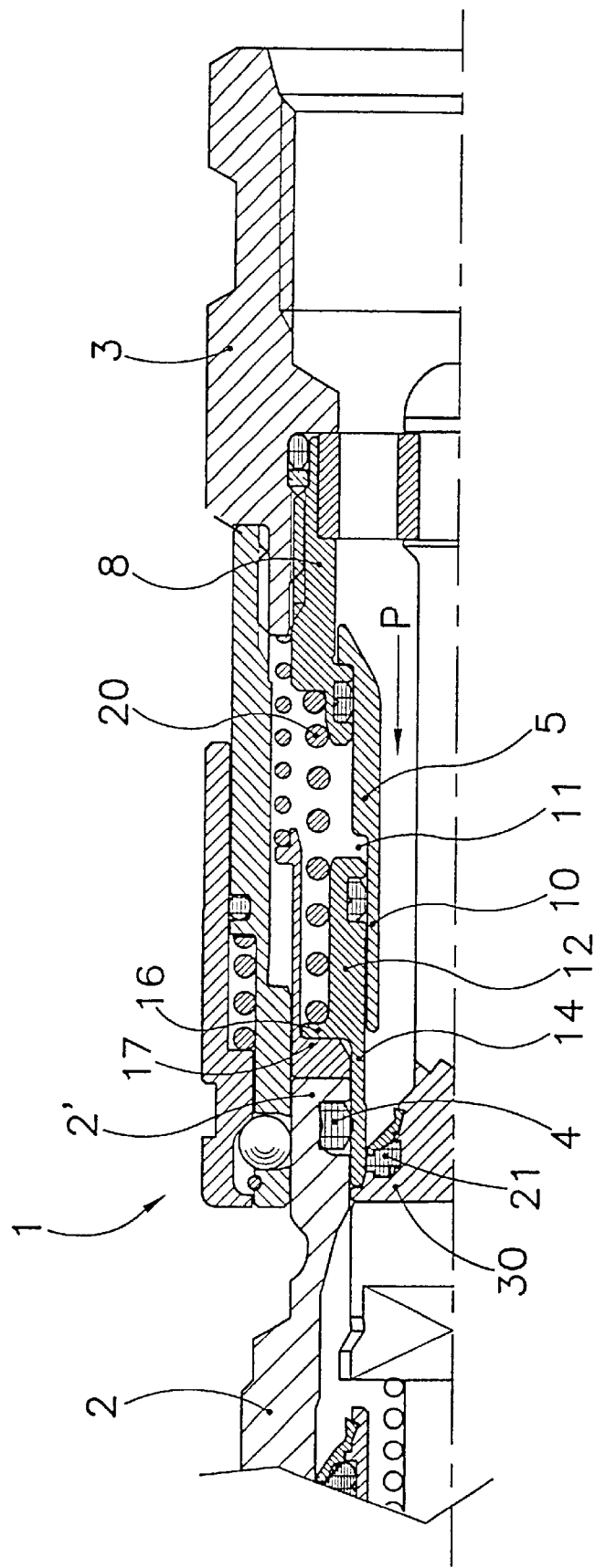
FIG. 3 shows the quick-connection coupling during the joining operation.
Figure 4:
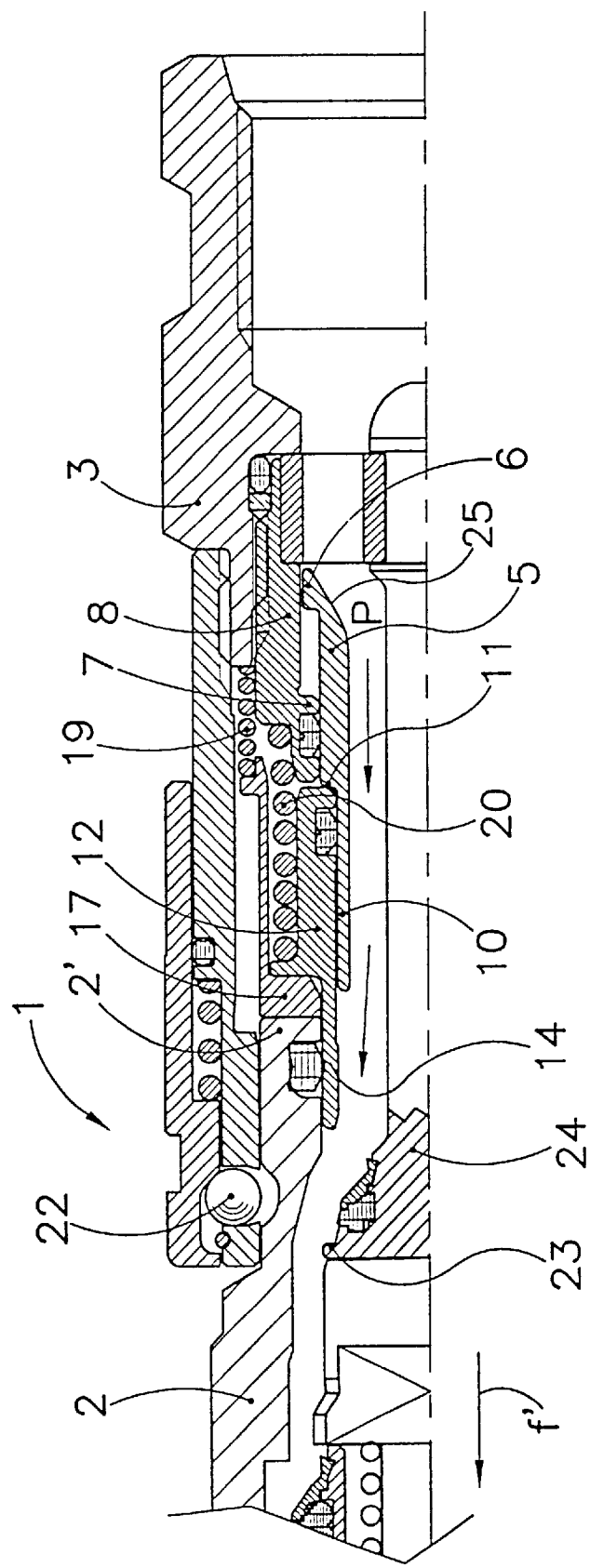
FIG. 4 shows the quick-connection coupling once the joining operation has been carried out.

FIG. 3 illustrates the quick-connection coupling 1 in a position in which the component 2 has been partially introduced into the sleeve-like component 3.

The front segment 2' of the projecting component 2 has already been introduced into the tubular chamber of the sleeve-like component 3, and the displaceable component 5 is still located in its original position. The same also applies to the displaceable component 12.

It can be gathered that the seal 4 is already arranged, and guided, on the outer surface of the front wall 14 of the displaceable component 12, and it can also be seen that the rear end of the thickened portion 17 has already come into contact with the annular step 16 of the movable component 12 and is influenced by the spring 20.

In this position, the projecting component 2 is connected in a form-fitting manner to the sleeve-like component. By virtue of the seals 4 and 21 being provided, the components 2, 3 of the quick-connection coupling have already been connected to one another in a fully sealed manner.

It should be pointed out that, in this connecting position, there is still no throughflow of the hydraulic fluid taking place from the component 3 to the component 2 or vice versa.

Following completion of the operation of joining the quick-connection coupling 1 by the projecting component 2 being introduced fully into the sleeve-like component (the parts being blocked in relation to one another with the aid of a known ball race 22, which is known and customary for such a quick-connection coupling) the front end 2' of the projecting part 2 acts on the annular thickened portion 17 and the movable part 12 is thus displaced further into the interior of the sleeve-like component 3. This achieves the situation where the inner end of the displaceable part 12 reaches the step 11 of the displaceable component 5 and, during the displacement operation of the part 5, the annular thickened portion 6 is moved away from the stop step 7 of the stationary sleeves 8.

If it is desired for the projecting component 2 to be separated from the sleeve-like component 3 again, the previously described movements are repeated in the opposite direction.

Releasing the projecting component 2 from the retaining arrangement provided with balls 22 makes it possible for the projecting component 2 to be moved in the direction of the arrow (f).

This movement means that the known displaceable component 18 is also displaced in the direction of the arrow (f) under the action of the expanding spring and, accordingly, the displaceable component 12 is also moved in the direction of the arrow (f) under the influence of the spring 20 until the free end of the wall 14 reaches the stop 23 of the step. The stop is provided at the end of the centrally arranged shaft 24.

As can also be gathered from the drawings, the component 5, which is provided on the inside in the radial direction, is not influenced by any spring means, in order for a reliable return movement of the component 5 to be achieved.

At its free end, the component advantageously has an annular, inclined surface 25, which serves as a guide surface on which the pressurized fluid acts and effectively and automatically moves the displaceable component 5 in the direction of the arrow (f).

It is essential for there to be no occurrence of leakage losses on account of hydraulic fluid escaping, either during the joining operation or during the separating operation of the components of the quick-connection coupling of flat configuration, or for there to be no risk of damage to the seal 4 provided in the interior of the projecting component 2.

What is claimed is:

1. A coupling arrangement for resisting fluid leakage during coupling and decoupling of a pair of flat-faced components having internal passages for carrying hydraulic fluid under pressure, the arrangement comprising:
   a) a stationary bushing fixedly mounted in one of the components, the bushing having a bushing stop;
   b) a first displaceable member extending along an axis and mounted in said one component for axial displacement, the first displaceable member having a first abutment;
   c) a second displaceable member extending along the axis and mounted for sliding movement on, and in a telescoping relationship with, the first displaceable member, the second displaceable member having a second abutment; and
   d) a third displaceable member extending along the axis and mounted for sliding movement on, and in a telescoping relationship with, the second displaceable member, the third displaceable member being axially moved by the other of the components during coupling to engage the second abutment and, in turn, to axially move the second displaceable member to engage the first abutment and, in turn, to axially move the first displaceable member away from the bushing stop, thereby bringing the internal passages in fluid communication.

2. The coupling arrangement of claim 1, and a return spring for constantly urging the second displaceable member to an initial rest position.

3. The coupling arrangement of claim 2, and another return spring for constantly urging the third displaceable member to an initial rest position.

4. The coupling arrangement of claim 1, and a first annular seal intermediate the bushing and the first displaceable member.

5. The coupling arrangement of claim 4, and a second annular seal intermediate the first and second displaceable members.

6. The coupling arrangement of claim 1, and a sealing ring mounted in the internal passage of the other of the components, for sealingly engaging the second displaceable member during coupling.

7. The coupling arrangement of claim 1, wherein the first displaceable member has a tapered surface.

8. The coupling arrangement of claim 1, and a shaft stop on said one component for preventing the second displaceable member from moving axially past its initial rest position during decoupling.

* * * * *